Aug. 18, 1970   L. RABIAN ET AL   3,524,708
MEASURING DEVICE

Filed Sept. 2, 1966   2 Sheets-Sheet 1

Inventors
Laszlo Rabian
Georg Grendelmeier
By Wenderoth, Lind & Ponack
Attorneys.

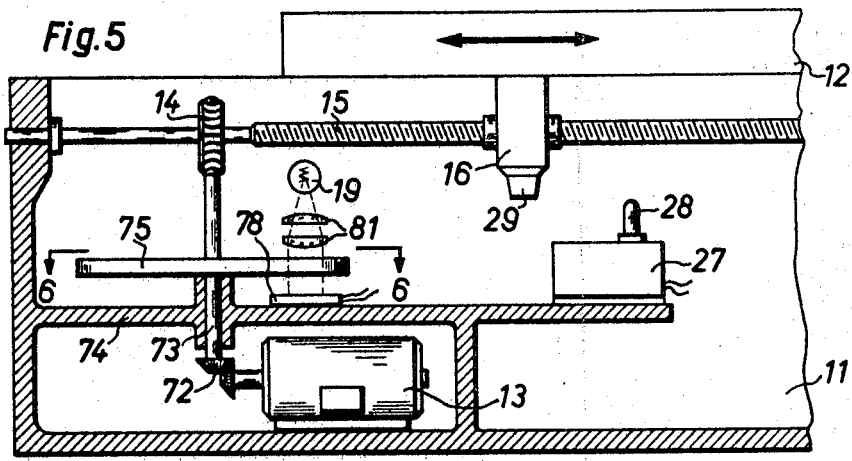
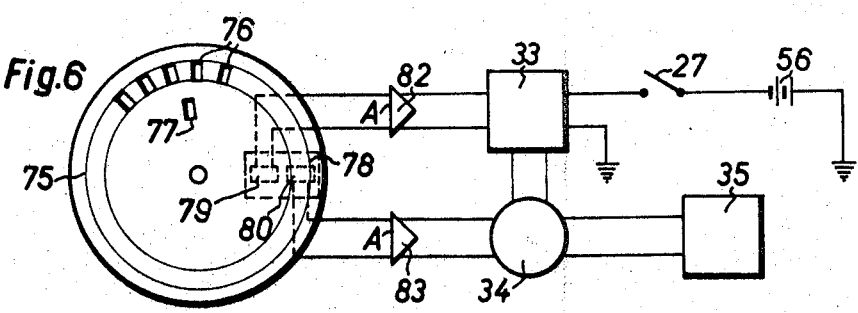
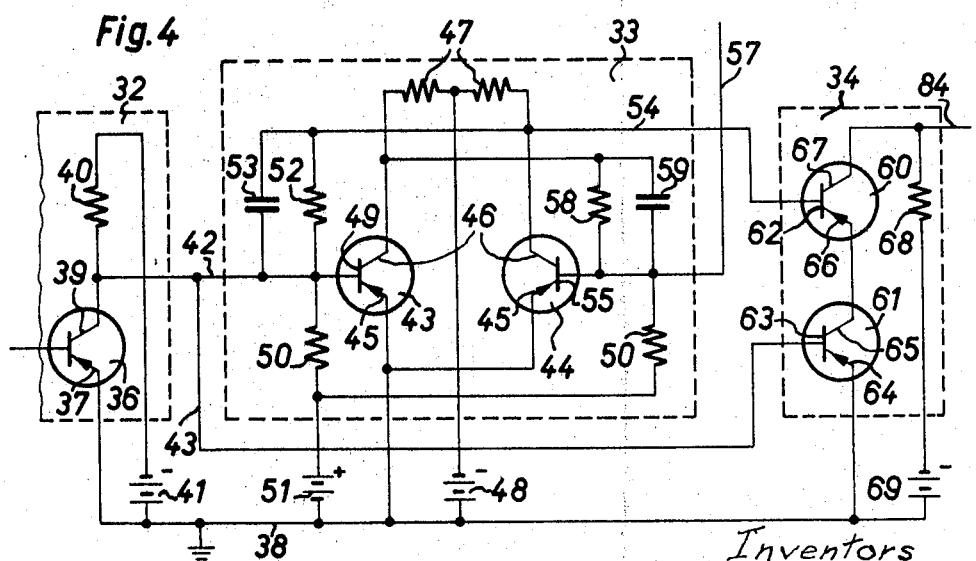
Inventors
Laszlo Rabian
Georg Grendelmeier
By Wenderoth, Lind & Ponack
Attorneys

United States Patent Office 3,524,708
Patented Aug. 18, 1970

3,524,708
MEASURING DEVICE
Laszlo Rabian, Zurich, and Georg Grendelmeier, Dietikon, Switzerland, assignors to Oerlikon-Buehrle Holding Ltd., Zurich, Switzerland
Filed Sept. 2, 1966, Ser. No. 576,990
Claims priority, application Switzerland, Sept. 2, 1965, 12,293/65
Int. Cl. G01b 11/00, 11/04
U.S. Cl. 356—170    4 Claims

ABSTRACT OF THE DISCLOSURE

An optical measuring device having carrier means with a support movable to an end position. A movable holder of optical signal marks with at least a part arranged to form a scale is on the support and driving means are provided for simultaneous displacement of the support and holder. An electro-optical sensing device for the signal marks generates upon movement of the carrier means out of the end position a train of electrical pulses which at least partly are in timed relation to the signal marks forming the scale and an electrical counter is provided for the electrical pulses. Electrical transmission means connect the sensing device to the counter with a blocking condition to block the transmission of the pulses to the counter. The transmission means has further an operative condition to transmit the pulses to said counter. Electrical control means has two electrical inputs. A first input is connected to the sensing device and the control means has a rest state and an operating state. The control means in rest state holds the transmission means in blocking condition and in operating state holds the transmission means in operative condition. Electrical switching means connects to the second input and is operable by the support both upon displacement of the support out of the end position and upon a displacement of the support into the end position to generate a first and a second electrical control pulse at the control means. The control means is shiftable from the rest state to the operating state by subsequent transmission of the first electrical control pulse and a shift pulse generated by the sensing device. The control means is shiftable to the rest state by a transmission of the second electrical control pulse.

---

This invention relates generally to measuring devices and more particularly to an optical device for effecting measurements.

The invention has particular reference to a device for measuring displacements of components of machine tools, such as worktables.

Still more particularly the invention relates to a device for measuring the displacements of a carrier of a machine tool, in which the carrier is moved together with a scale, and a sensor device transmits counting pulses generated by the division lines of the scale to an electrical counter.

In the prior art successive displacements of the carrier were measured by the counting pulses thereby emitted alone. This method is therefore known as "incremental method" by contrast to the absolute method, in which the measurement always commences at a fixed datum point. The incremental method has the disadvantage for the operator that after a number of successive displacements of the carrier the location of the latter can only be determined by the addition or/and subtraction as the case may be of all the counting pulses previously received by the counter. Experience shows that such calculations often result in errors.

To obviate such errors it would be possible to consider always taking the end position of the carrier as datum point and measuring any new position of the carrier by the number of pulses corresponding to the displacement of the carrier from its end position to its new position. This would, however, give rise to the difficulty that it is only possible to arrive at a clearly defined end position for the carrier, especially where heavy clamping tables and the like are involved, at great expense. It is a further object of the invention to obviate these disadvantages and difficulties by defining a precisely described initial point for the counting pulses.

A further object of the invention is to provide a transmission device in the counter circuit which has a blocked and operating position, in the latter of which the transmission device blocks or releases counting pulses by way of the counter electrical current. There is furthermore provided a control device for the transmission device, having a rest position and an operating position, which is switched into the rest position by an initial electrical signal generated by a terminal switch actuated by the carrier when this moves into its end position, in which rest position it holds the transmission device in the blocked position, and is switched over to the operating position by a second electrical signal generated by the displacement of the carrier from its end position by way of the sensor device, in which operating position it switches the transmission device into the operating position.

With the above and other objects in view which will become apparent from the detailed description below, some preferred embodiments of the invention are shown in the drawings, in which:

FIG. 4 illustrates in more detail a section of the circuit shown in FIG. 3.

FIG. 5 is a view similar to FIG. 1 illustrating in diagrammatical form a second embodiment of the invention, and FIG. 6 is a view taken upon section line 6—6 of FIG. 5 illustrating a portion of the sensor device in conjunction with an electrical circuit diagram for the embodiment of the invention shown in FIG. 5.

Figure 1:
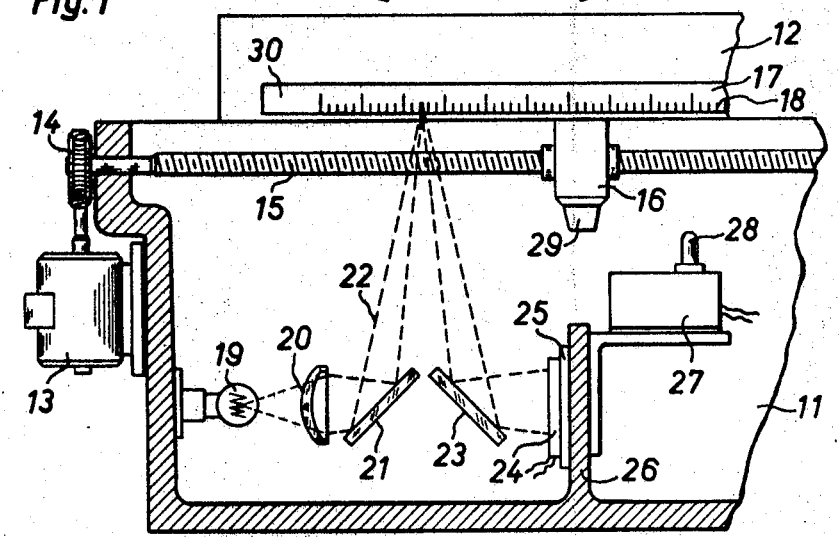
FIG. 1 is a partial diagrammatic cross-sectional view of a machine tool illustrating one form of the invention.

In accordance with FIG. 1, on the stand 11 of a machine tool a clamping table 12 can be displaced backwards and forwards in the direction marked by the arrow. This is accomplished by a lead screw spindle 15 mounted rotatably in the stand 11, driven by a motor 13 by way of a worm gear 14, on which a nut 16 is located which is fixed rigidly to the table 12. On the table 12 a glass scale 17 is fixed extending along the line of displacement of the table and provided with a series of division lines 18.

Figure 2:
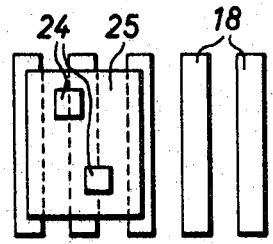
FIG. 2 is a partial elevational view of a portion of the sensor device.

In the interior of the stand 11 is located an incandescent lamp 19 in front of which are positioned a collector lens 20 and a mirror 21. By means of the lens 20 a converging pencil of rays 22 is formed, which is directed by the mirror 21 on to the glass scale 17. The reverse side of the scale, not visible in FIG. 1, is rendered reflecting by means of silvering, so that the incident pencil of rays 22 is reflected to the mirror 23 and is directed by the latter to a pair of photo cells 24 mounted in the stand 11. On the surfaces of these, the division lines of the scale are reproduced in magnified size, as is illustrated in FIG. 2. The two photo cells of the pair 24 are arranged in a holder 25 in such a manner that they are spaced from one another both in the longitudinal direction of the division lines 18 and also transverse thereto. The displacement in this latter direction is of the same magnitude as the width of the division lines reproduced, and the width of the apertures of the two photo cells in this direction also corresponds to the width of the division lines reproduced.

To a lateral partition wall 26 in the stand 11 carrying the holder 25 an electrical terminal switch 27 is also affixed, which can be closed by pressing down a plunger 28. When the table 12 is displaced against its end position, said plunger runs against a cam 29 on the nut 16, so that when the table 12 is in its end position the terminal switch is closed, while at the same time the pencil of rays 22 falls on a section 30 of the scale 17 which does not display any division lines. In accordance with FIG. 3 the terminal switch 27 is connected on the one hand to the negative pole of a battery 56 and on the other hand to a conductor 57. The position of the first division line of the scale 17 in relation to the terminal switch 27 is such that when the table is displaced out of its end position, at the moment that the switch 27 opens, one of the two photo cells is already covering the first-division line, while the other photo cell is still within the range 30 of the reproduced scale 17.

Figure 3:
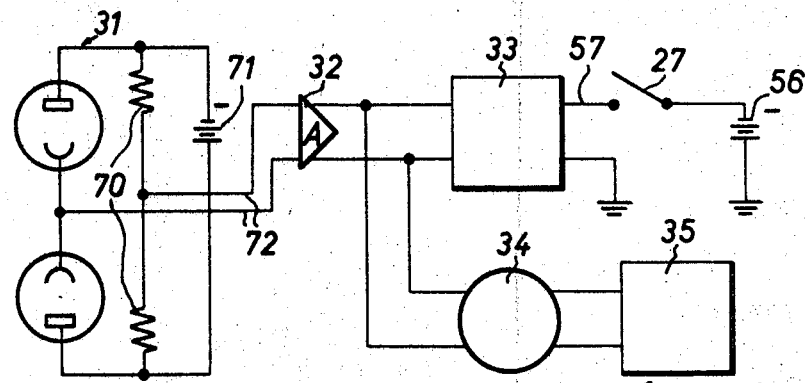
FIG. 3 illustrates an electrical circuit diagram used with the construction shown in FIG. 1.

In accordance with FIG. 3, the two photo cells 24 are included in a bridge circuit 31, the output of which is connected by way of an amplifier 32 both to a bi-stable multi-vibrator 33 and to a gate 34. The output of this latter is conducted to a counter 35. The bridge circuit 31 incorporates in each of two branches a resistance 70. To one diagonal a battery 71 is connected, while the other diagonal is connected by way of the connection 72 to the amplifier 32. The arrangement of the bi-stable multi-vibrator 33 and the gate 34 can be seen in detail from FIG. 4.

In FIG. 4 the only portion of the amplifier 32 illustrated is the output stage with the transistor 36, the emitter 37 of which is connected to the common earth connector 38 and the collector 39 of which is connected by way of a resistance 40 to the negative pole of a battery 41. The voltage present at the collector 39 is conducted by way of the connections 42 and 43 in parallel to the bi-stable multi-vibrator 33 and the gate 34.

The bi-stable multi-vibrator 33 is provided with two transistors 43 and 44, the emitters 45 of which are earthed and the collectors 46 of which are connected by way of one resistance 47 each to the negative pole of a battery 48. The base 49 of the transistor 43 is directly connected to the wire 42 and is also connected by way of a resistance 50 to the positive pole of a battery 51 and by way of a resistance 52 and of a condensor 53 fitted in parallel to it to the output of the bi-stable multi-vibrator as represented by the wire 54.

The base 55 of the transistor 44 is on the one hand connected directly to a connection 57 leading by way of the terminal switch 27 to the negative pole of a battery 56. On the other hand the base 55 is connected in a similar manner to that of the base of transistor 43 by way of the resistance 50 to the positive pole of the battery 51 and by way of a resistance 58 and of a condensor 59 fitted in parallel to this to the collector 46 of the transistor 43.

The gate 34 is provided with two transistors 60 and 61, the bases 62 and 63 of which are directly connected to the connections 54 and 43 respectively. While the emitter 64 of the transistor 61 is directly connected to the earth connector 38, its collector 65 is connected directly to the emitter 66 of transistor 60. A wire 84 leading to the counter 35 is on the one hand connected directly to the collector 67 of the transistor 60 and on the other hand by way of the resistance 68 to the negative pole of the battery 69.

The operation of the apparatus as described is as follows. When the table 12 is located ien in its end position, in which the cam 29 holds the terminal switch 27 closed, the negative voltage of the battery 56 is connected directly to the connector 57 and thereby also to the base 55 of transistor 44. As a consequence of this the transistor 44 must assume a condition of conductance, no resistance subsisting between the collector 46 and the emitter, so that the wire 54 displays zero voltage. As the base 49 of the transistor 43 there now subsists sufficient positive voltage to hold the transistor 43 in a condition of non-conductance. This voltage arises from the fact that at the transistor 36 of the amplifier 32, which is in a condition of non-conductance, a splitting up of the voltage comes into being at the two resistances 50 and 52 fed by the battery 51, while when the transistor 36 is conducting, the wire 42 connected directly with the base 49 of the transistor 43 displays a zero voltage. When the terminal switch 27 is closed, the bi-stable multi-vibrator 33 is in a rest position independently of whether counter pulses arrive by way of the amplifier 32 or not.

The transmission device 34 for the counting pulses, which takes the form of a gate remains in the blocked position when the terminal switch 27 is closed, as the base 62 of the transistor 60 is at zero voltage by consequence of its connection to the wire 54, so that this transistor is in a state of non-conductance. Any pulses arriving by way of wire 43 from the amplifier 32 will indeed actuate the transistor 61. But in consequence of the blocking of the transistor 60 this would have no effect on the counter circuit 84 leading to the counter 35.

If the table 12 is displaced from its end position by means of the motor 13 through the drive 14, the spindle 15 and the nut 16, the optically reproduced scale 17 moves in relation to the bracket 25 of the photo cells in FIG. 2 from right to left, until the lower photo cell 24 in that figure is covered off by the first division line. As a consequence of this, the bridge circuit 31 is no longer balanced, so that a voltage arises at the input to the amplifier 32, as a result of which the transistor 36 goes into a condition of conductance. This has, however, no effect on the bi-stable multi-vibrator 33, as the terminal switch 27 is still closed. When the table 12 is displaced further, the terminal switch 27 now goes over to the open position, before, however, the first division line of the optically reproduced scale 17 covers the two photo cells 24 equally as is shown in FIG. 2 for the second terminal division line.

The opening of the terminal switch 27 has as a result the removal of the negative voltage hitherto subsisting from the battery 56 at the base 55 of the transistor 44 of the bi-stable multi-vibrator 33. In spite of this the transistor 44 remains in a condition of conductance, as the resistances 50 and 58 are so formed that the two batteries 48 and 51 maintain a sufficiently negative voltage at the base 55. If the pair of photo cells 24 now reach the position illustrated in FIG. 2 in relation to the first of the division lines 18, where each photo cell half covers the division line, the bridge circuit 31 is balanced and no voltage subsists at the input to the amplifier 32. The transistor 36 is therefore in a state of non-conductance, and at the base 49 of the transistor 43 and the wire 42 directly connected to it there subsists a voltage resulting from the ratio between the resistances 40, 50 and 52, which is sufficiently negative to tip the transistor 43 into the conductance condition. As under these circumstances its collector 46 assumes a zero voltage, there arises between the resistances 50 and 58 a sufficiently positive voltage to tip the transistor 44 into the condition of non-conductance. The bi-stable multi-vibrator 33 is thus transferred by the first counting pulse into the operating condition.

When the transistor 44 is in the condition of non-conductance, the wire 54 carries the negative voltage of the battery 48. The transistor 60 in the gate 34, the base of which is also connected to the wire 54, now goes into the condition of conductance. At the same time the base 63 of the transistor 61 of the gate 34 is connected to the negative pole of the battery 41 by way of the wire 43 from the amplifier 32, so that this transistor too goes into the condition of conductance. As now the two transistors 60 and 61 of the gate 34 are in the condition of conductance, the wire 84 leading to the counter 35 is at zero voltage and thereby transmits the first counting impulses to the counter 35.

When the table 12 is displaced further, the pair of photo cells 24 moves out of the symmetrical position illustrated in FIG. 2 so that one of the cells is more intensely illuminated and the other less. The bridge circuit 31 is therefore unbalanced and a voltage reaches the input to the amplifier 32 by way of the wire 72 and sends its transistor 36 into the condition of conductance. The negative voltage at the wire 42 necessary for the continued maintenance of the transistor 43 in the condition of conductance is now no longer transmitter from the battery 41 but from the battery 48 to one of the resistances 47, the wire 54, the resistance 52 and the wire 42 and so to the base 49. From this it will be clear that once the bi-stable multi-vibrator 33 has been switched into the operating position, this condition cannot be changed by any following counting pulses. On the other hand, the latter pass by way of the wire 43 to the transistor 61 belonging to the gate 34, and bring this last alternately into the conductance and non-conductance conditions. As at the same time the transistor 60 is constantly in the condition of conductance, the counting pulses pass as previously described to the counter 35.

When the table 12 returns to its end position the terminal switch 27 is reclosed. As a result of this the negative voltage of the battery 56 is transmitted by way of the wire 57 to the base 55 of the transistor 44, so that the bi-stable multi-vibrator 33 resumes its position of rest in the manner already described, putting the gate 34 into the blocked position. The bracket 25 for the two photo cells 24 could be arranged on the partition wall 26 to be displaceable in such a way that it could be adjusted in the direction of displacement of the stepwise optically reproduced scale 17 out of a zero position, as is described in our co-pending application of even date entitled "A Device for the Automaic Movement of a Scale." In this connection the terminal switch 27 can be used, in addition to the control of the bi-stable multi-vibrator 33 as already described, to set the bracket 25 back to its end position.

The second embodiment illustrated in FIGS. 5 and 6 differs from the first embodiment mainly in the design of the optical-electrical sensor device. Those components common to the two embodiments, are therefore given the same reference symbols. The slide 12 guided on the stand 11 of a machine tool is fitted as in the first embodiment with a nut 16 through which a lead screw spindle 15 mounted rotatably passes. The drive of this latter is effected by a motor 13 which is connected to the spindle 15 by way of a bevel gear 72, an intermediate shaft 73 and a worm drive 14. The intermediate shaft 73 is mounted rotatably in a partition wall 74 provided for the purpose in the stand 11 and is fitted at a certain distance from this wall with a disc 75. In the neighborhood of the circumference of this disc a row of slits 76 of rectangular shape is provided all around, while at a smaller radius an additional single slit 77 is located, which viewed circumferentially is positioned between two of the slits 76.

Below the disc 75 a pair of photo cells 79 and 80 (see FIG. 6.) are mounted on a bracket 78 attached to the partition wall 74, in such a way that the cell 79 is at an equal distance from the axis of the disc 75 as the slit 77, while the cell 80 on the other hand is at the same distance from the said axis as the slits 76. Above the disc 75 there are mounted in the stand 11 in a manner not delinated in greater detail a collector lens 81 and an incandescent lamp 19 in such a manner that the pencil of rays leaving the lens 81 is able to pass through the slits 76 and 77 and fall on the two photo cells 79 and 80. In the stand 11 a terminal switch 27 is also mounted in such a manner that it is capable of being closed by means of a push button 28. This closure takes place when the cam 29 on the nut 16 touches the button 28 on arrival of the slide 12 in its end position.

In accordance with FIG. 6 the photocell 79 is connected by way of an amplifier 82 with a bi-stable multi-vibrator 33, while the photo cell 80 is connected by way of an amplifier 83 to the gate 34. A more detailed description of the bi-stable multi-vibrator 33 and the gate 34 is unnecessary, as both are laid out similarly and connected to one another in the same way as is shown in FIG. 4. The control of the vibrator 33 by the terminal switch 27 connected to the battery 56 is also carried out in the same manner as in the first embodiment.

The method of operation of the measuring device as shown in FIGS. 5 and 6 is as follows. If the slide 12 is originally in its end position the terminal switch 27 is held in the closed position by the cam 29. As a result of this the vibrator 33 is held in the rest position in the manner described in FIG. 4, the gate 34 being blocked so that no counting pulses can reach the counter 35. On displacement of the slide 12 away from its end position the slots 76 move past the photo cell 80, each transition of a slit generating a negative pulse at the output of the amplifier 83, which brings the transistor 61 in the gate 34 into the condition of conductance as has been described previously in connection with FIG. 4. The worm drive 74 and the position of the spindle 15 are so selected that every counting pulse reaching the gate circuit 34 corresponds to a displacement of the slide 12 by $\frac{1}{100}$ mm.

The opening of the terminal switch 27, which takes place before slit 77 passes over the photocell 79, has no influence on the bi-stable multivibrator 33, as the later receives a negative voltage from the output of the amplier 82 which maintains it in the position of rest in the manner described in conjunction with FIG. 4 When the slit 77 now passes over the photocell 79, there arises at the input of the amplifier 82 a voltage which brings its transistor 36 into the condition of non-conductance. At the base 49 of the transistor 43 of the bi-stable multi-vibraor 33 there thus subsists a negative voltage which tips the latter into the operating position in the manner described in conjunction with FIG. 4, as a result of which the transistor 60 of the gate 34 comes into the condition of conductance. The subsequent counting pulses generated by the slits 76 can now pass without hindrance, through the gate 34, which is in the operating position, to the counter 35. The bi-stable multivibrator 33 remains in the operating position until the terminal switch 27 is closed by the return of the slide 12 to its end position.

We claim:

1. An optical measuring device for machine tools and the like comprising carrier means comprising a support movable rectilinearly relatively to an end position, a movable holder of optical signal marks is mounted on said support, said marks having at least a part arranged to form a scale and driving means for simultaneous displacement of said support and said holder; an electro-optical sensing device for said signal marks to generate upon movement of said carrier means out of said end position a train of electrical pulses which at least partly are in timed relation to the signal marks forming said scale, an electrical counter for said electrical pulses generated in timed relation, electrical transmission means connecting said sensing device to said counter, said transmission means having a blocking condition to block the transmission of said pulses generated in timed relation to said counter, said transmission means having further an operative condition to transmit the last named pulses to said counter;; electrical control means having two electrical inputs, a first one of said inputs being connected to said sensing device, said control means having further a rest state and an operating state, said control means in said rest state holding said transmission means in said blocking condition and in said operating state holding said transmission means in said operative condition; electrical switching means connected to the second one of said inputs of said control means operable by said support both upon displacement of said support out of said end position and upon a displacement of said support into said end position to generate a first and a second electrical control pulse at said control means, said control means being shiftable from said rest state to said operating state by subsequent transmission of said first electrical control pulse and a shift pulse generated by said sensing device, said control means being further shiftable to said rest state by transmission of said second electrical control pulse.

2. A device as set forth in claim 1 wherein said control device consists of a bi-stable multivibrator.

3. A device as set forth in claim 1 wherein said holder is provided with a straight scale carrying an initial signal mark so that upon displacement of said support out of said end position said initial signal mark generates said shift pulse.

4. A device as claimed in claim 1 wherein said holder is rotatably journaled and is provided with signal marks disposed circularly forming said scale, and wherein a further signal mark is disposed outside said signal marks forming said scale, said further signal mark generating said shift pulse upon displacement of said support out of said end position.

References Cited

UNITED STATES PATENTS

| | | | |
|---|---|---|---|
| 2,948,890 | 8/1960 | Barth et al. | 356—170 |
| 3,124,880 | 3/1964 | Rantsch | 356—170 |

FOREIGN PATENTS

| | | |
|---|---|---|
| 966,408 | 8/1964 | Great Britain. |

RONALD L. WIBERT, Primary Examiner

T. R. MOHR, Assistant Examiner

U.S. Cl. X.R.

356—156